(12) United States Patent
Novak

(10) Patent No.: US 8,812,200 B2
(45) Date of Patent: Aug. 19, 2014

(54) METHOD FOR DETERMINING AN OPERATING CONDITION OF A POSITIVELY ENGAGING SHIFTING ELEMENT OF A TRANSMISSION DEVICE

(71) Applicant: ZF Friedrichshafen AG, Friedrichshafen (DE)

(72) Inventor: Rainer Novak, Bregenz (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/762,569

(22) Filed: Feb. 8, 2013

(65) Prior Publication Data

US 2013/0220053 A1  Aug. 29, 2013

(30) Foreign Application Priority Data

Feb. 27, 2012  (DE) .......................... 10 2012 202 903

(51) Int. Cl.
| | |
|---|---|
| G06F 7/00 | (2006.01) |
| G06F 17/00 | (2006.01) |
| G06F 19/00 | (2011.01) |
| F16H 59/02 | (2006.01) |
| F16H 59/68 | (2006.01) |
| F16H 61/12 | (2010.01) |

(52) U.S. Cl.
CPC ................ *F16H 59/02* (2013.01); *F16H 59/68* (2013.01); *F16H 2061/1208* (2013.01)
USPC .............................. 701/51; 74/473.11; 701/67

(58) Field of Classification Search
None
See application file for complete search history.

(56) References Cited

U.S. PATENT DOCUMENTS

| | | | |
|---|---|---|---|
| 7,395,729 B2 | 7/2008 | Heinrich | |
| 2007/0245842 A1* | 10/2007 | Petzold et al. | ................. 74/335 |
| 2009/0250310 A1* | 10/2009 | Popp et al. | .................. 192/85 R |

FOREIGN PATENT DOCUMENTS

| | | |
|---|---|---|
| DE | 10 2004 010 271 A1 | 9/2005 |
| DE | 10 2009 023 168 A1 | 12/2010 |
| DE | 10 2010 028 762 A1 | 11/2011 |
| WO | 2010/136131 A1 | 12/2010 |
| WO | 2011/138102 A1 | 11/2011 |

OTHER PUBLICATIONS

German Search Report Corresponding to DE 10 2012 202 903.6.

* cited by examiner

*Primary Examiner* — Helal A Algahaim
*Assistant Examiner* — Kelly E Darby
(74) *Attorney, Agent, or Firm* — Davis & Bujold, PLLC; Michael J. Bujold

(57) ABSTRACT

A method of determining an operating state of a form-locking shift element of a transmission apparatus that, at least for changing one operating state between a disengaged operating state and an engaged operating state, is pressurized with an actuating pressure by a pressure-conducting region of the transmission apparatus. The pressure of the pressure-conducting region is monitored. Depending on the progression of the pressure of the pressure-conducting region, while pressurizing the form-locking shift element with the actuating pressure for changing the operating state, checking whether the form-locking shift element has the requested operating state.

16 Claims, 4 Drawing Sheets

METHOD FOR DETERMINING AN OPERATING CONDITION OF A POSITIVELY ENGAGING SHIFTING ELEMENT OF A TRANSMISSION DEVICE

This application claims priority from German patent application serial no. 10 2012 202 903.6 filed Feb. 27, 2012.

FIELD OF THE INVENTION

The invention relates to a method for determining an operating state of a form-locking shift element of a transmission apparatus.

BACKGROUND OF THE INVENTION

Transmissions known from practice are designed with, among others, so-called displacement sensors in the region of hydraulic consumers, the operating states of which can be characterized with respect to a defined position of the elements, which can move in relation to each other, and using the displacement sensors can precisely determine the respectively present operating states of such hydraulic consumers of the transmission apparatus.

If however, for operating a transmission apparatus, it is only necessary to know a respective operating state characterized by an end position of a movable element of such a hydraulic consumer, the respectively assigned displacement sensor does not need to measure the entire path of the movable element but rather so-called limit switches are sufficient by means of which the specific end positions of the hydraulic consumers can be determined. As displacement sensors generally have higher manufacturing costs than limit switches, transmission apparatuses are preferably implemented having limit switches in the region of hydraulic consumers.

Displacement sensors or limit switches are however characterized by a high constructive design and require a defined construction space which is not available to the necessary extent in various transmission apparatuses, which is why displacement sensors and/or limit switches can be used only with significant expenditure or in certain circumstances not at all.

SUMMARY OF THE INVENTION

The problem addressed by the present invention is therefore to provide a method by means of which the operating state of a form-locking shift element of a transmission apparatus can be determined in a constructively simply and inexpensive manner while simultaneously having low construction space requirements.

With the method according to the invention for determining an operating state of a form-locking shift element of a transmission apparatus, that, at least for changing an operating state between a disengaged operating state and an engaged operating state, is in each case pressurized with actuating pressure by a pressure-conducting region of the transmission apparatus, the pressure of the pressure-conducting region is monitored. Additionally, depending on the progression of the pressure of the pressure-conducting region, during pressurization of the form-locking shift element with actuating pressure for changing the operating state, it is checked whether the form-locking shift element is in the requested operating state.

Using the method according to the invention, particularly operating states of form-locking shift elements of transmission apparatuses can be determined for which the exact path progression of movably implemented elements of the shift elements between two end positions is not important for the functioning of the transmission apparatus, rather only the so-called trigger signals are sufficient, i.e. for example the signal "claw engaged" or the signal "claw disengaged". In contrast to friction engaged shift elements, such as clutches or brakes, such hydraulic consumers or such form-locking shift elements are not controlled using a desired target trajectory for realizing a filling phase, fill compensation phase, ramps and the like. Form-locking shift elements should typically take on the requested operating state within brief operating times using a time optimized path progression, and thus in each case represent a so-called mechanical switch. For reliable operation of a transmission apparatus having such hydraulic consumers or having form-locking shift elements it is important to detect whether the form-locking shift element has attained the desired or requested operating state, or is stuck in an intermediate position, and then specific operating states of the transmission apparatus cannot be started.

The progression of the pressure of the pressure-conducting region can be determined for example using a pressure sensor provided in the region of the pressure-conducting region in a manner favorable with respect to cost and construction space, because pressure sensors cost less in comparison to displacement sensors or limit switches, and the pressure sensor can be disposed in a region of a transmission apparatus where sufficient construction space is available for the pressure sensor. Using such a pressure sensor, by which the system pressure of the transmission apparatus can be determined for example, it is possible to calculate brief oil flows in the direction of individual hydraulic consumers such as claws, clutches or the like, and for example to estimate piston speeds or piston travel without expensive displacement sensors characterized by high construction space needs.

Using the method according to the invention it is possible to determine in a simple manner an adjustment speed and also an adjustment path in the region of a form-locking shift element, wherein the procedure according to the invention can be used for an arbitrary number of form-locking shift elements of a transmission device that are not simultaneously actuated, and for example only one pressure sensor assigned to a central pressure-conducting region is necessary, by means of which several form-locking shift elements can be pressurized with actuating pressure.

Both the processes for engaging and disengaging a form-locking shift element can be monitored because the method according to the invention can be implemented independently of the movement direction of a movably implemented element.

Using the procedure according to the invention the demands of further hydraulic consumers such as clutches, brakes and the like can be monitored, wherein the progression of the pressure-conducting region is also used for plausibility checking of further operating states or operating conditions of a transmission apparatus, for instance an operation of a pump device of the transmission apparatus, a valve setting the pressure of a pressure-conducting region, a pressure buildup at low operating temperatures of the transmission apparatus, an actuation of the form-locking shift element with the presence of oil foaming or high air portions in hydraulic fluid present in the region of lines connecting the form-locking shift element to the pressure-conducting region, during so-called saturation situations, during which hydraulic consumers of a transmission apparatus draw more pressure means than is presently available from a source of pressure means supplying the pressure-conducting region with pressure means, and the like.

Furthermore, the procedure according to the invention can be implemented robustly with respect to external influences and can be adapted with minimum expenditure to the respective application case, for example to temperature dependencies, and the like.

The method according to the invention is fundamentally based on the realization that, from the dynamics of the pressure of the pressure-conducting region, i.e., from undesired pressure changes over the operating time, specific disturbance signals or flow disturbances in the hydraulic system of a transmission apparatus can inferred. Additionally, the procedure according to the invention is also based on the fact that form-locking shift elements such as claws typically do not change the operating state thereof without a cause, preferably by applying external forces, but rather require appropriate actuating energies for an operating state change, which are typically triggered by applying an actuating pressure to the form-locking shift element. Shifting of form-locking shift elements are characterized in that for a brief time, preferably in the range of 10 to 15 milliseconds, at appropriate operating temperatures, they withdraw very high flows of pressure means, for example 10 to 15 liters per minute, from the pressure-conducting region, and therefore cause high flow loading. The flow loads in the region of a valve device normally cannot be regulated because the dynamics thereof are too slow for that purpose. Operating state changes of form-locking shift elements generate, for this reason, sufficient excitation energy, which for analysis purposes is available in the form of a characterizing pulse response in the progression of the pressure of the pressure-conducting region.

The pressure of the pressure-conducting region can be viewed as a dynamic system having several input variables, for example a pilot pressure, a flow, an operating temperature and the like. Thus, an operating state change of a form-locking shift element at constant preset pressure of the pressure of the pressure-conducting region by pilot pressure, provides a pulse response for controlling the pressure of the pressure-conducting region in response to a flow disturbance.

For this reason with an advantageous variant of the method according to the invention, during pressurization of the form-locking shift element with actuating pressure, based on the progression of the pressure of the pressure-conducting region, a change occurring in the pressure is determined, and depending thereupon, a flow disturbance is determined, based upon which an adjustment speed and an adjustment path can be determined in the region of the form-locking shift element in a manner that is favorable for construction space and expense.

For determining the flow disturbance, for example, a transfer function can be assumed between an imaginary physical input signal of the pressure of the pressure-conducting region or a flow, and an output signal of the pressure of the pressure-conducting region, and subsequently with a measured output signal and known dynamics, the required input signal can be calculated, that is, the adjustment speed and the adjustment path.

With a variant of the method according to the invention that can be performed within short operating times, the flow disturbance corresponds to a quotient of the pressure change occurring during pressurizing the form-locking shift element and a factor depending on the current operating point of a source of pressure means supplying the pressure-conducting region with pressure means.

This procedure can be advantageously implemented if a disturbance transfer function representing the disturbance dynamic of the pressure of the pressure-conducting region can be reduced to a so-called high frequency amplification, and all other coefficients of the control transfer function, for example a second order linear system, or also a higher order linear system or a non-linear model, are equal to zero. Then, the system pressure disturbance is proportional to the disturbance volume flow of the pressure means, and the stronger the drop in pressure of the pressure-conducting region is while actuating the form-locking shift element, the faster the form-locking shift element implements the requested change of operating state.

At the same time, a change of operating state in the region of the form-locking shift element that was not performed properly would be detected if the progression of the pressure of the pressure-conducting region abruptly approaches a stationary predefined value before completion of a defined operating interval, because the pressure-conducting region is no longer subjected to high flow disturbance occurring during the operating state change of the shift element.

For ensuring the sampling rate required for the latter described evaluation, it is possible to implement a trigger switch in the immediate region of the pressure sensor.

If the hydraulic system for performing a proper operating state change of a form-locking shift element of the transmission apparatus is more complex, with a further variant of the method according to the invention the flow disturbance corresponds to a quotient of the pressure change occurring while pressurizing the form-locking shift element, and a disturbance transfer function representing the disturbance dynamic of the pressure-conducting region, in which the denominator polynomial is preferably equal to the numerator polynomial, and in which for instance the damping values in the region of the hydraulic system, and also the flow force dependencies and similar can be considered. The system pressure dynamic can for instance be approximated by a second order linear system. Using the linear model, which is assumed to be pulse transfer capable, and the convolution sum that can be determined using the disturbance transfer function, even with complex considerations, a properly implemented operating state change can be verified in the region of a form-locking shift element.

If the hydraulic control of a transmission apparatus serves other hydraulic consumers, which also create sufficiently large system pressure disturbances, or significant disturbances in the progression of the pressure of the pressure-conducting region, for example during a filling phase of a friction clutch, then the filling behavior of such a consumer can also be made plausible by the latter named variant.

With a variant of the method according to the invention that can be implemented with low complexity, during pressurization of the form-locking shift element with actuating pressure, it is checked whether the pressure of the pressure-conducting regions within a predefined time interval falls below a first threshold and subsequently again exceeds a second threshold, wherein with a positive query response it is determined that the shift element has the requested operating state, and whereas with a negative query response, an improper course is verified in the region of the form-locking shift element.

In order to be able to consider temperature dependencies and the like, for example, in a simple manner, the two threshold values vary in a further variant of the method according to the invention depending on the respectively present operating states of the transmission apparatus.

If the evaluation is based on threshold values of the same size, the data storage volume necessary for performing the method according to the invention is low.

If threshold values that deviate from each other are used, pressure fluctuations depending on the path in the region of the pressure of the pressure-conducting region can be considered during actuation of a form-locking shift element in a simple manner.

If while pressurizing the form-locking shift element with actuating pressure, it is checked whether the present progression of the pressure of the pressure-conducting region lies within a predetermined range, and if, with a positive query result, it is determined that the shift element has the requested operating state, then the monitoring of a requested operating state change can be performed without additional computational power at low expense, within short operating times.

If the predefined range varies depending on the respectively present operating state of the transmission apparatus, temperature dependent fluctuations, for example, can be considered in a simple manner, during actuation of the form-locking shifting element.

The predefined range can be selected for example using a tolerance interval for the disturbance in the region of the pressure of the pressure-conducting region. This procedure is feasible if a form-locking shift element during a change in the operating state always creates approximately the same flow disturbance in the pressure-conducting region, and a valve, adjusting the pressure of the pressure-conducting region, has a reproducible dynamic, because the measured pressure disturbance then always shows approximately the same progression in the region of the pressure-conducting region.

Features specified in the following example embodiments of the approach according to the invention are suitable, alone or in any arbitrary combination, to further develop the subject matter according to the invention. The respective combinations of features with respect to the further development of the subject matter according to the invention do not represent limitations, but rather merely comprise examples.

Further advantages and advantageous embodiments of the subject matter according to the invention arise from the example embodiments described in the following based in principle on the drawings, where for the sake of clarity, in the description of the different example embodiments, components that are the same or functionally equivalent are provided with the same reference numbers.

DETAILED DESCRIPTION OF THE PREFERRED EMBODIMENTS

Figure 1:
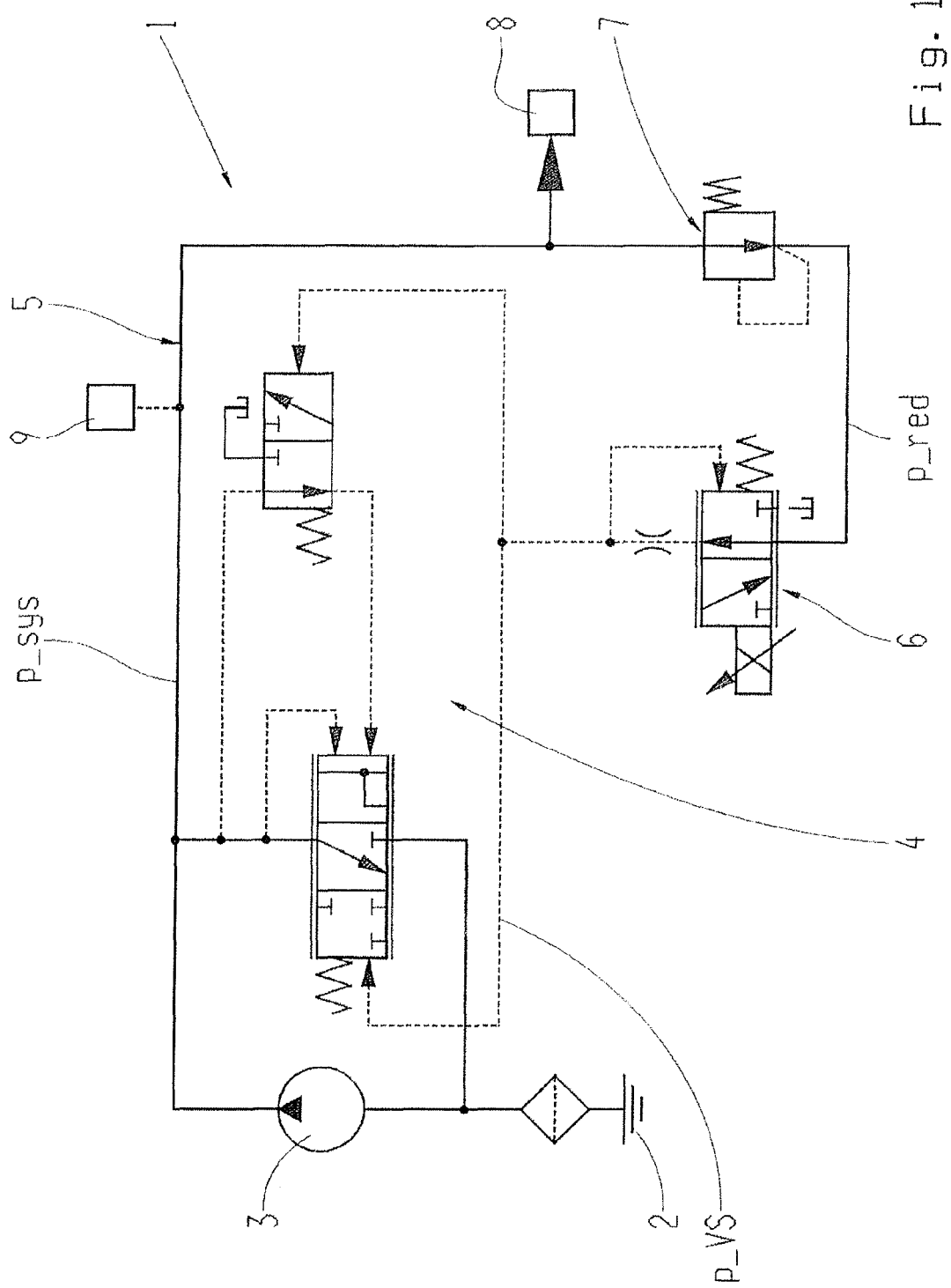
FIG. 1 a schematic partial view of a hydraulic system of a transmission apparatus.

FIG. 1 shows a part of a hydraulic system 1 of a transmission apparatus of a vehicle, not shown in more detail, having a substantially pressure-free hydraulic reservoir 2 of a source of pressure means 3 implemented as a fixed displacement pump, and a valve device 4, by means of which a pressure p_sys of a pressure-conducting region 5 can be adjusted depending on a pilot pressure p_VS. The pilot pressure p_VS can be adjusted in a known manner in the region of an electrical pressure regulator 6, which is presently implemented as a magnet valve. The pilot pressure p_VS can take on maximum values of a so-called reducing pressure p_red, which is set in the region of a pressure control valve 7.

The pressure means source 3, or the fixed displacement pump, is presently coupled mechanically to a transmission input shaft and is driven with the speed of the drive engine of the drive train implemented with a transmission device, or driven with a speed depending hereon, whereby the conveyed volume of the pressure means source 3 increases with increasing speed of the drive engine.

The pressure-conducting region 5 is connected to hydraulic consumers of the transmission apparatus, wherein a hydraulic consumer is implemented as form-locking shift element 8, and can be shifted between a disengaged operating state and an engaged operating state by appropriate pressurization with an actuating pressure originating from the pressure-conducting region 5. For this purpose, the form-locking shift element 8 can be pressurized with hydraulic pressure in a known manner in the region of a piston, and, with appropriate actuation, can be shifted between a first end position, which is equivalent to a completely disengaged operating state of the shift element 8, and a second end position, which is equivalent to a completely engaged operating state of the shift element 8.

A pressure sensor 9 for measuring the pressure p_sys of the pressure-conducting region 5 is provided in the region of the pressure conducing region 5, whereby the pressure p_sys can be monitored during the operation of the transmission apparatus.

If there is an appropriate request for disengaging or engaging the form-locking shift element 8, the form-locking shift element 8 is pressurized with actuating pressure from the pressure-conducting region 5. During the pressurization of the form-locking shift element 8 with actuating pressure, depending on a progression of the pressure p_sys of the pressure-conducting region 5 determined by the pressure sensor 9, it is checked in a manner to be described in the following in more detail whether the form-locking shift element 8 has the requested operating state.

Figure 2:
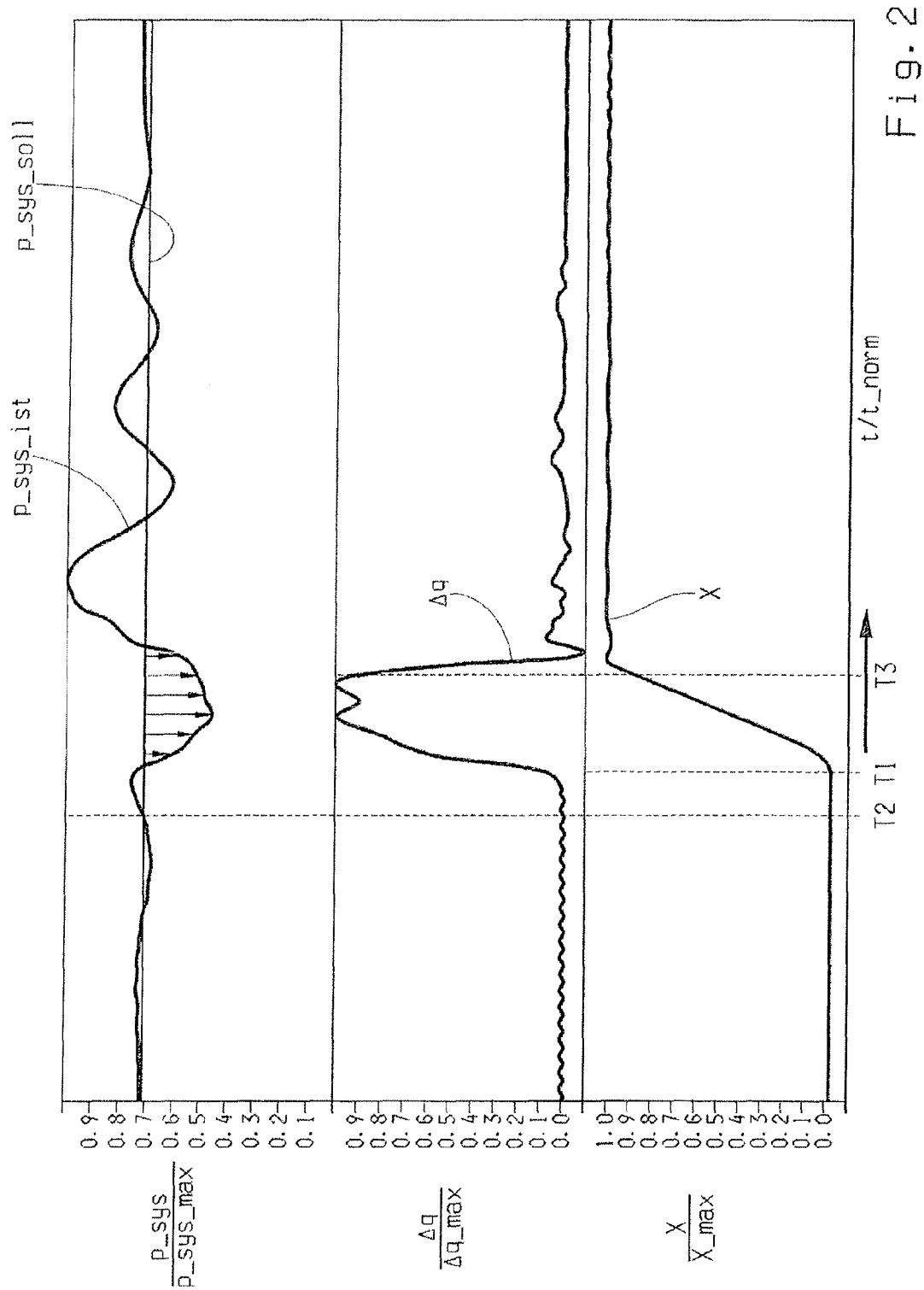
FIG. 2 several normalized progressions of different operating parameters of a transmission apparatus over the normalized operating time t/t_norm.

FIG. 2 shows several progressions of different operating parameters of the hydraulic system 1, and of the form-locking shift element 8, over the normalized operating time t/t_norm in a normalized representation during a progression of the operating state, during which an operating state change of the form-locking shift element 8 is requested and performed, starting from a disengaged or engaged operating state in the direction of an engaged or disengaged operating state. A progression of the actual pressure p_sys_ist of the pressure-conducting region 5, which is normalized with respect to the maximum pressure p_sys_max of the pressure-conducting region 5, substantially corresponds, up to a time T1, to a progression of the target pressure p_sys_soll also normalized with respect to the maximum pressure p_sys_max. FIG. 2 concurrently shows a progression of a flow disturbance, or an oil disturbance flow Δq in the region of the pressure-conducting region 5, which is represented normalized with respect to the maximum pressure flow Δq_max, and a progression of the displacement path X of the piston of the form-locking shift element 8 normalized with respect to the maximum displacement path X_max. The progression of the displacement path X up to time T1 is substantially equal to zero, thus, the piston of the form-locking shift element 8 is located in an end position thereof equivalent to the present operating state.

The request for changing the operating state of the form-locking shift element 8 is already present before the time T1, after which the piston of the form-locking shift element 8 is shifted due to pressurization from the present end position thereof in the direction of the second end position thereof. As the form-locking shift element 8 is pressurized with actuating pressure via the pilot operated valve device 4, the pressure p_sys is already triggered before the actual shift of the piston of the form-locking shift element 8 by actuating the valve device 4 assigned to the form-locking shift element 8 that causes the impulse shaped progression of the actual pressure p_sys_ist of the pressure-conducting region 5 between a time T2, preceding the time T1, and the time T1. Starting at time T1, the actual pressure p_sys_ist falls below the target pressure p_sys_soll in the manner shown in FIG. 2. At the same time, the flow disturbance Δq increases with a steep gradient, and only after attaining the second end position of the piston of the form-locking shift element 8, falls again toward zero after time T3. Due to the flow forces which act on a valve slide of the valve device 4, the system pressure disturbance of the actual pressure p_sys_ist does not immediately decline to zero during the shifting of the form-locking shift element 8 or the piston thereof. Even after attaining the second end position of the piston of the form-locking shift element 8, the actual pressure p_sys_ist requires a certain time until the excitation due to the actuation of the form-locking shift element 8 decreases and the actual pressure p_sys_ist corresponds substantially to the target pressure p_sys_soll.

Using the pressure sensor 9, it is possible to continuously monitor the pressure p_sys of the pressure-conducting region 5, and, depending on deviations of the actual pressure p_sys_ist from the target pressure p_sys_soll, to determine brief oil flows of an individual hydraulic consumers of the transmission apparatus such as claws, clutches and the like. Thereby, speeds of pistons or displacement paths of pistons can be estimated without additional position sensors.

With suitably designed system pressure dynamics of the hydraulic system 1, which is characterized by stable shifting, filtering out feed flow pulsations and the like, the algorithm can be simplified to evaluating simple trigger thresholds. Here, from the dynamics of the pressure p_sys of the pressure-conducting region 5, or from the undesired pressure changes over the operating time t, inferences are made to specific disturbance signals, that is, to the presence of the flow disturbance Δq. For determining the flow disturbance Δq, a transfer function is assumed between an imaginary physical input signal of the system pressure, that is, presence of the flow, and an output signal, that is, the pressure p_sys of the pressure-conducting region 5, and then using the measured output signal and the known dynamics, calculations are made about the desired input signal or the displacement speed or the displacement path X of the form-locking shift element 8.

They system pressure dynamic is approximated by the following second order linear system:

$$Gd = \Delta p\_sys/\Delta q = (a0 + a1 \times s + a2 \times s^2)/(b0 + b1 \times s + b2 \times s^2)$$

The variable Gd of the disturbance dynamic corresponds to the pressure p_sys of the pressure-conducting region 5, and the variables a0, a1, a2, b0, b1, b2 are operating point-dependent coefficients and the variable s is a Fourier variable. Different system dependent variables, such as flow force amplification of the valve device 4, can be considered with the determination of the adjustment speed or the displacement or adjustment path X of the form-locking shift element 8, using the operating point dependent coefficients a0 to b2.

As the pressure p_sys of the pressure-conducting region 5 during a quasi-stationary operating state has a so-called high pass characteristic, and thus is substantially constant, increases in the drive engine speed for example and the correspondingly increasing pump flow cause only very slow flow disturbances. For this reason, an actuation of the form-locking shift element 8 can presently be regarded as a quasi-stationary operating state with respect to the drive speed of the drive engine, and the disturbance dynamic Gd of the pressure p_sys of the pressure-conducting region 5 or the high frequency amplification can be reduced to the quotient of the factors a2 and b2, because all other coefficients a0, a1, b0, and b1 are zero. Therefore a pressure change Δp_sys of the pressure p_sys equals the product of the quotient of the coefficients a2 and b2 and the flow disturbance Δq. This means that the system pressure disturbance Δp_sys is proportional to the disturbance oil flow Δq. Consequently, it follows that the stronger the drop in pressure p_sys, the faster the operating state change takes place in the region of the form-locking shift element 8.

If the change in operating state of the form-locking shift element 8 were discontinued within a time interval between the times T1 and T3, for example by the piston getting stuck before attaining the second end position thereof, then the progression of the actual pressure p_sys_ist would abruptly approach the stationary predetermined target pressure p_sys_soll, because the pressure p_sys is no longer exposed to the high flow disturbance Δq in the time interval between the times T1 and T3.

With a software recording of the two trigger thresholds T1 and T2, wherein the time T1 represents the start time of actuating the form-locking shift element 8, and the time T3 substantially represents the end time of a proper actuation of the form-locking shift element 8, in the case of a decreasing reaction in the system pressure to the flow disturbance Δq before the expiration of the time interval defined by the two points T3 and T1, it can be easily detected that the requested change in the operating state in the region of the form-locking shift element 8 was not performed to the desired extent. This means however that a sufficiently high sampling rate of the pressure signal of the pressure p_sys is necessary for the latter described monitoring of the operating state of the form-locking shift element 8.

For estimating the adjustment travel X of the piston of the form-locking shift element 8 the following formulaic relationship can be used:

$$\Delta q = v \times A = d/dt \times X \times A$$

Here the variable A corresponds to the piston area of the piston of the form-locking shift element 8, the variable X to the adjustment travel X of the piston, and the variable v indicates the speed of the piston of the form-locking shift element 8.

The claw position can be determined by simple integration of the pressure signal of pressure p_sys of the pressure-conducting region 5:

$$X = A/Gd \times \int \Delta pHD \times dt$$

The variable ΔpHD corresponds to the system pressure disturbance of the pressure p_sys at the operating point.

Figure 3:
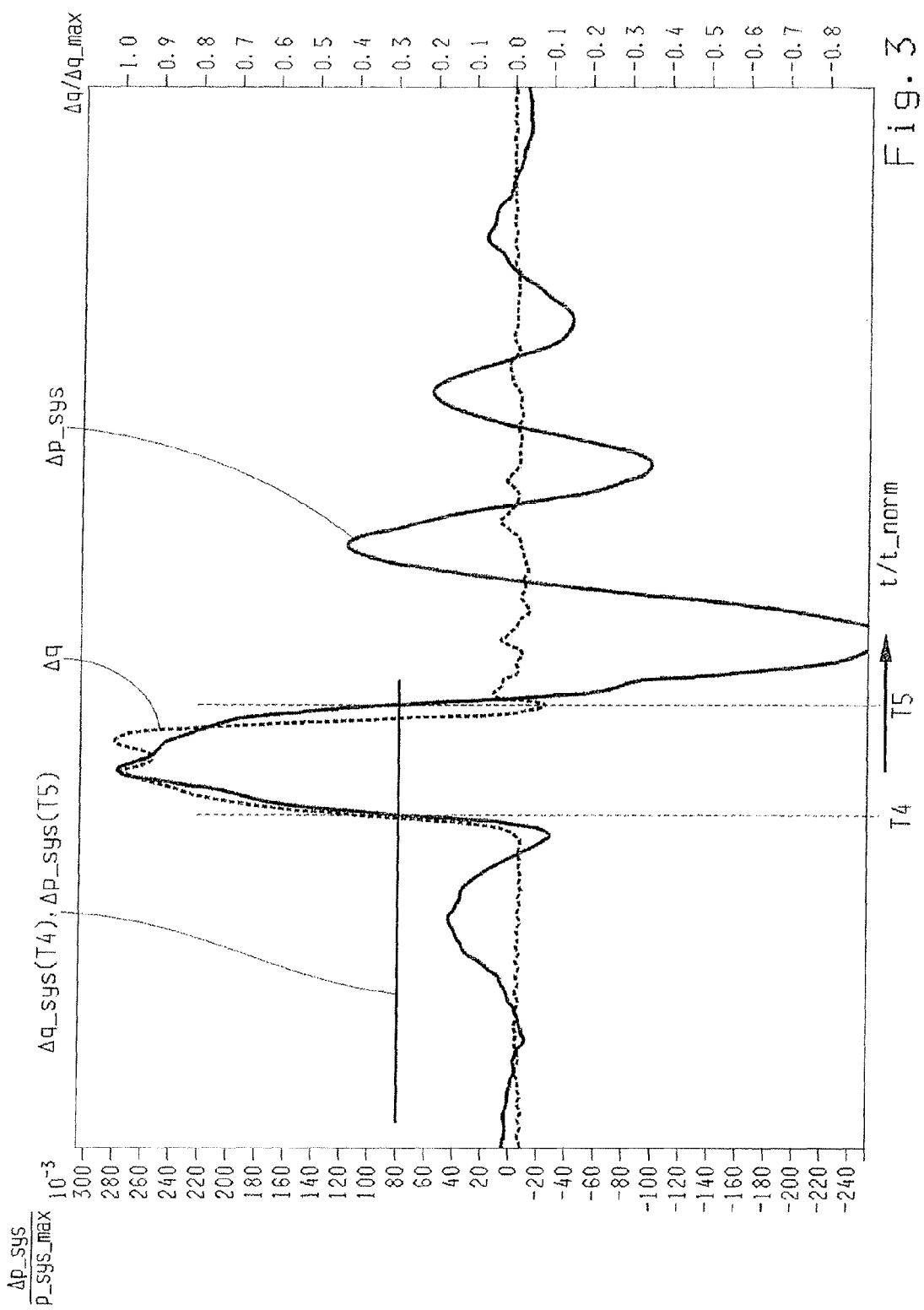
FIG. 3 normalized progressions of a pressure-conducting region of a transmission apparatus and a flow disturbance in the region of the pressure-conducting region over the normalized operating time t/t_norm during actuation of a form-locking shift element of a transmission apparatus.

With a simplified determination of the operating state of the form-locking shift element 8, a monitoring based on the representation according to FIG. 3 is sufficient for determining whether the actual pressure p_sys_ist of the pressure-conducting region 5 or the system pressure disruption Δp_sys falls below or exceeds a respective threshold value Δp_sys(T4) or Δp_sys(T5) at the times T4 and T5, in order to verify whether the requested change in operating state in the region of the form-locking shift element 8 was or was not performed to the desired extent.

Figure 4:
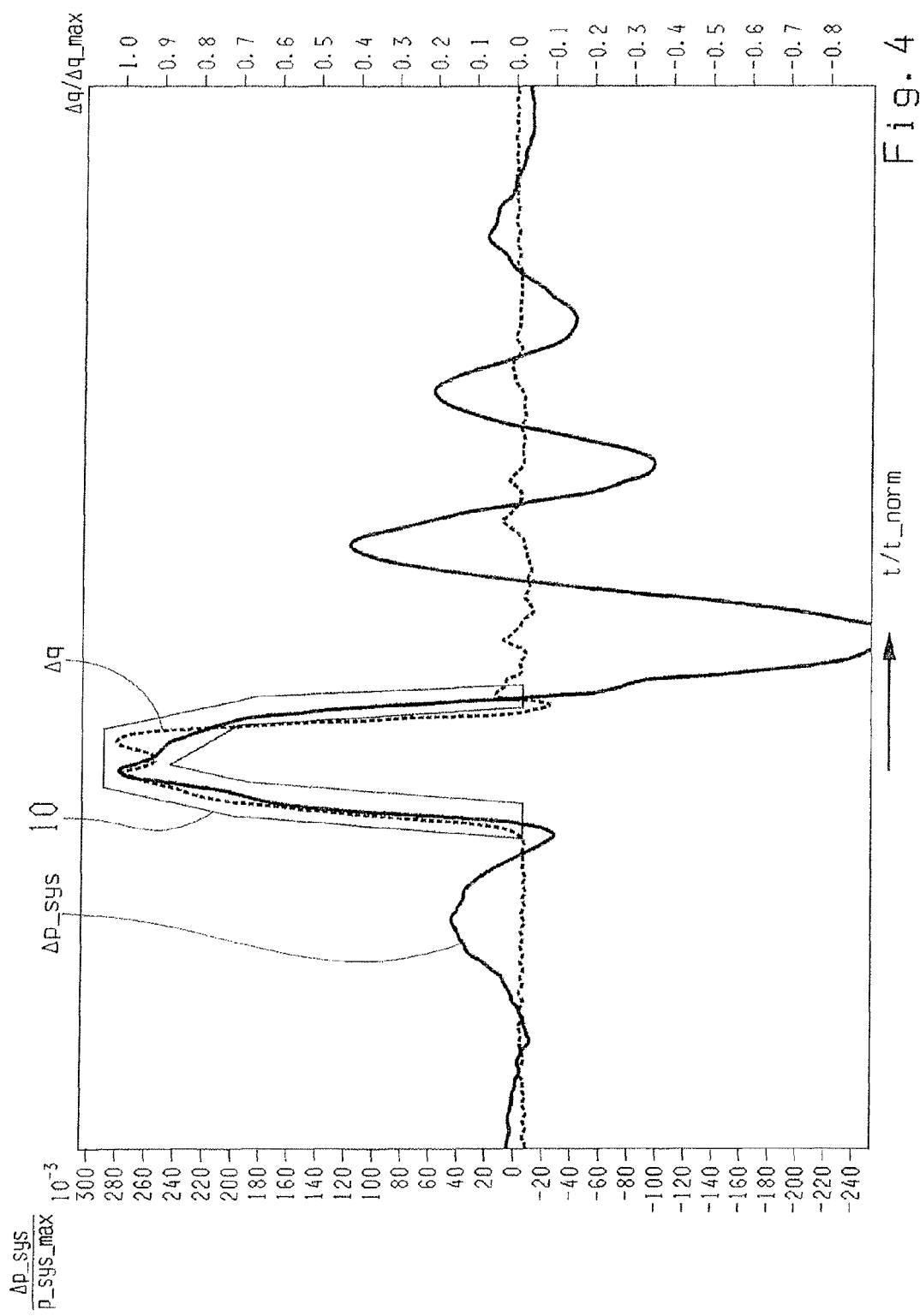
FIG. 4 a representation corresponding to FIG. 3, with a defined tolerance band superimposed on the progressions.

FIG. 4 shows a representation based on a further variant for determining an operating state of the form-locking shift element 8. With this procedure, for avoiding computational operations, a tolerance interval or tolerance range 10 is selected that is superimposed on the normalized progression of the system pressure disturbance Δp_sys and the flow disturbance Δq in the manner shown in FIG. 4.

This procedure is feasible if approximately the same flow disturbance Δq is always created during changes in the operating state of the form-locking shift element 8, and the valve slide of the valve device 4 has a reproducible dynamic, because the measured system pressure disturbance Δp_sys then always shows approximately the same progression. In contrast to the evaluation possibility using system pressure dynamics approximated by a linear system, the termination criterion during an improper operating state change is attained much earlier with the procedure according to FIG. 4, because with a faulty operation state change in the region of the form-locking shift element 8 both the system pressure change Δp_sys and the flow disturbance Δq immediately fall outside of the tolerance range 10, and the error can be detected immediately.

REFERENCE CHARACTERS

1 hydraulic system
2 hydraulic reservoir
3 source of pressure means
4 valve device
5 pressure-conducting region
6 pressure regulator
7 pressure relief valve
8 form-locking shift element
9 pressure sensor
10 tolerance range
A piston area
a0, a1, a2 operating point dependent coefficient
b0, b1, b2 operating point dependent coefficient
Gd disturbance dynamics
ΔpHD system pressure disturbance at the operating point
p_red reducing pressure
p_sys pressure of the pressure-conducting region
p_sys_max maximum pressure of the pressure-conducting region
p_sys_ist actual pressure
p_sys_soll target pressure
p_VS pilot pressure
Δp_sys system pressure disturbance
Δp_sys(T4) threshold value
Δp_sys(T5) threshold value
p_VS pilot pressure
Δq flow disturbance
Δq_max maximum flow disturbance
s Fourier variable
t operating time
t/t_norm normalized operating time
T1 to T5 discrete point in time
v adjustment speed
X displacement path
X_max maximum displacement path

The invention claimed is:

1. A method of determining an operating state of a form-locking shift element (8) of a transmission apparatus that, at least for changing an operating state between a disengaged operating state and an engaged operating state, is pressurized by a pressure-conducting region (5) of the transmission apparatus with an actuating pressure, the method comprising the steps of:
   providing a transmission apparatus with at least one shift element (8) that is pressurized by the pressure-conducting region (5) of the transmission apparatus;
   monitoring the pressure (p_sys) of the pressure conducting region (5) with a pressure sensor (9);
   checking whether the form-locking shift element (8) has changed to a requested operating state, depending on a progression of the pressure (p_sys_ist) of the pressure-conducting region (5) during the pressurization of the form-locking shift element (8) with actuating pressure for a change of the operating state;
   while pressurizing the form-locking shift element (8) with actuating pressure, determining an arising pressure change (Δp_sys) based on the progression of the pressure (p_sys_ist) of the pressure-conducting region (5), and
   depending thereupon, determining the flow disturbance (Δq), based upon which of an adjustment speed and a displacement path (X), in the region of the form-locking shift element (8).

2. The method according to claim 1, further comprising the step of calculating the flow disturbance (Δq) from a quotient of the pressure change (Δp_sys), occurring during the pressurization of the form-locking shift element (8), and a factor (a2/b2) that is dependent on a present operating point of a pressure means source (3) supplying the pressure-conducting region (5) with pressure means.

3. The method according to claim 1, further comprising the step of calculating the flow disturbance (Δq) from a quotient of the pressure change (Δp_sys), occurring during the pressurization of the form-locking shift element, and representing a disturbance dynamic (Gd) of the pressure dynamic (Δp_sys) of the pressure-conducting region (5) at a present operating point via a disturbance transfer function.

4. The method according to claim 1, further comprising the steps of, while pressurizing the form-locking shift element (8) with actuating pressure, querying whether the pressure (p_sys) of the pressure-conducting region (5), within a predefined time interval, falls below a first threshold and again subsequently exceeds a second threshold, and
   if the query is positive, determining that the shift element (8) has changed to the requested operating state.

5. The method according to claim 4, further comprising the step of varying the first and the second thresholds depending on a respectively present operating state of the transmission apparatus.

6. The method according to claim 4, further comprising the step of defining the first and the second thresholds values as being equal to one another.

7. The method according to claim 4, further comprising the step of defining the first and the second thresholds values as differing from one another.

8. The method according to claim 1, further comprising the steps of, while pressurizing the form-locking shift element (8) with the actuating pressure, querying whether the present progression of the pressure (p_sys_ist) of the pressure-conducting region (5) lies within a predefined range (10), and
   with a positive query, determining that the shift element (8) has achieved the requested operating state.

9. The method according to claim 8, further comprising the step of varying the predefined range (10) depending on a respectively present current operating state of the transmission apparatus.

10. A method of determining an operating state of a form-locking shift element (8) of a transmission apparatus that, at least for changing an operating state between a disengaged operating state and an engaged operating state, is pressurized by a pressure-conducting region (5) of the transmission apparatus with an actuating pressure, the method comprising the steps of:

providing a transmission apparatus with at least one shift element (8) that is pressurized by a pressure-conducting region (5) of the transmission apparatus;

monitoring the pressure (p_sys) of the pressure-conducting region (5) with a pressure sensor (9);

checking whether the form-locking shift element (8) has changed to a requested operating state, depending on a progression of the pressure (p_sys_ist) of the pressure-conducting region (5) during the pressurization of the form-locking shift element (8) with actuating pressure for the change of the operating state;

while pressurizing the form-locking shift element (8) with actuating pressure, querying whether a system pressure disruption ($\Delta$p_sys) one of falls below and exceeds a respective system pressure disruption threshold value ($\Delta$p_sys(T4), $\Delta$p_sys(T5)); and if the query is positive, determining that the shift element (8) has changed to the requested operating state.

11. The method according to claim 10, further comprising the step of, while pressurizing the form-locking shift element (8) with actuating pressure, querying whether the pressure (p_sys) of the pressure-conducting region (5), within a predefined time interval, falls below a first threshold and again subsequently exceeds a second threshold, and varying the first and the second thresholds depending on a respectively present operating state of the transmission apparatus.

12. The method according to claim 10, further comprising the step of defining the first and the second threshold values as being equal.

13. The method according to claim 10, further comprising the step of defining the first and the second threshold values as differing from one another.

14. The method according to claim 1, further comprising the steps of, while pressurizing the form-locking shift element (8) with the actuating pressure, querying whether a present progression of one of a system pressure disturbance ($\Delta$p_sys) of the pressure-conducting region (5) and a flow disturbance ($\Delta$q) of the pressure-conducting region (5) lies substantially continuously within a predefined range (10), and with a positive result to the query, determining that the shift element (8) has achieved the requested operating state.

15. The method according to claim 14, further comprising the step of varying the predefined range (10) depending on a respectively present current operating state of the transmission apparatus.

16. The method according to claim 14, further comprising the step of with a negative result to the query, immediately determining that an error has occurred in changing the operating state of the shift element (8).

* * * * *